United States Patent [19]

Srivastava

[11] Patent Number: 5,187,567
[45] Date of Patent: Feb. 16, 1993

[54] AUTOMATIC VIDEO PEAKING SYSTEM

[75] Inventor: Gopal K. Srivastava, Arlington Heights, Ill.

[73] Assignee: Zenith Electronics Corporation, Glenview, Ill.

[21] Appl. No.: 770,502

[22] Filed: Oct. 3, 1991

[51] Int. Cl.$^5$ .......................... H04N 9/77; H04N 9/78
[52] U.S. Cl. ................................. 358/21 R; 358/31; 358/39; 358/40
[58] Field of Search .................. 358/21 R, 39, 31, 38, 358/40

[56] References Cited

U.S. PATENT DOCUMENTS

| 4,538,178 | 8/1985 | Bolger | 358/39 |
| 4,623,924 | 11/1986 | Wargo | 358/39 |
| 4,963,958 | 10/1990 | Sendelweck | 358/39 |

FOREIGN PATENT DOCUMENTS

| 2111344 | 6/1983 | United Kingdom | 358/31 |
| 2118396 | 10/1983 | United Kingdom | 358/39 |

Primary Examiner—Tommy P. Chin

[57] ABSTRACT

A television receiver includes a frequency multiplexed video processor which processes chrominance and luminance signals in response to synchronously detected composite video information. The composite video signal is separated into a plurality of frequency spectra which are individually processed utilizing digital electronic circuitry to achieve high performance and cost effectiveness. A comb filter is operative within one of the processors to provide separation of the luminance and chrominance information within the chrominance signal bandpass to maintain high frequency luminance signal components. A separate processor and bandpass filter are operative to provide separate control of the luminance peaking within the system. Conventional luminance and chrominance processing converts the output signals of the multiplexed processor to RGB video signals which are applied to a conventional cathode ray tube display having a conventional deflection system associated therewith.

14 Claims, 6 Drawing Sheets

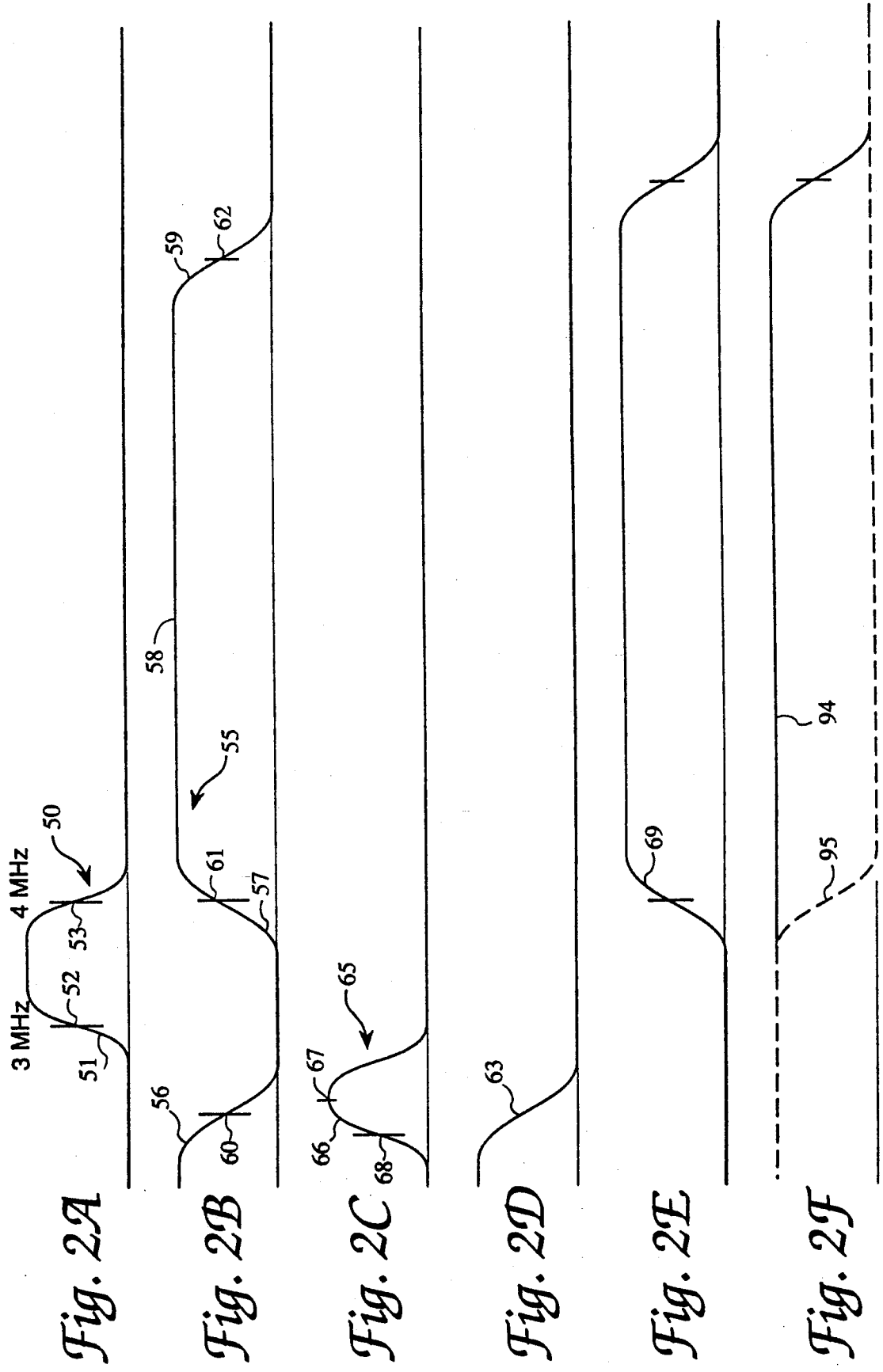

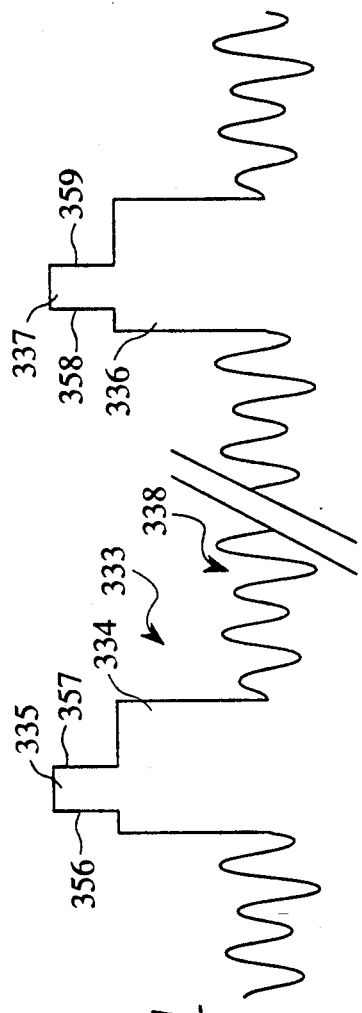
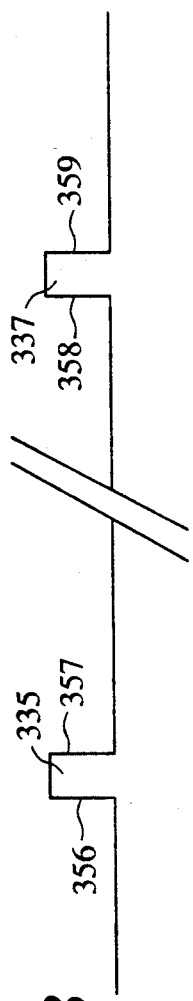
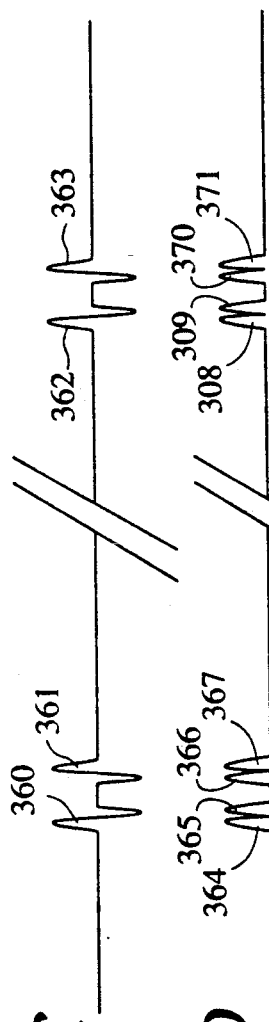
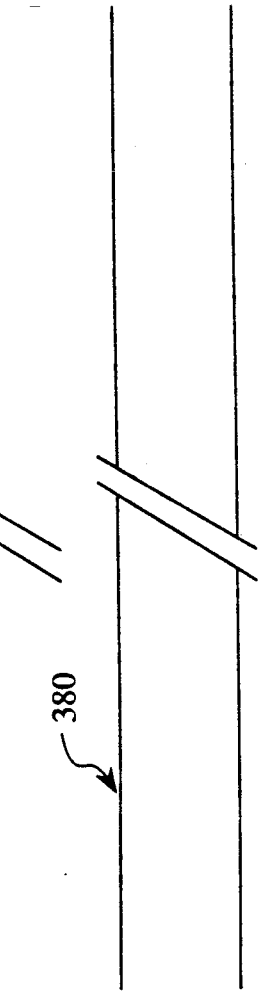
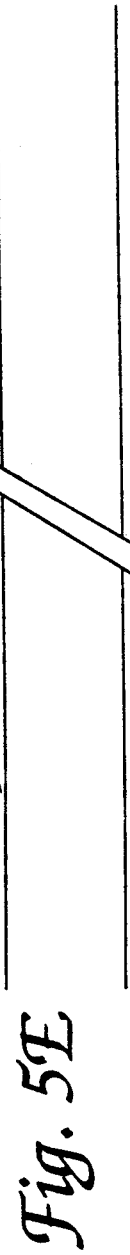

AUTOMATIC VIDEO PEAKING SYSTEM

FIELD OF THE INVENTION

This invention relates generally to television receivers and particularly to the systems therein for processing luminance and chrominance information.

BACKGROUND OF THE INVENTION

Color television systems have been developed using several different broadcast and signal processing formats to achieve the successful transmission and reception of color television programming. While substantial differences between systems exist, they all must satisfy the basic objective of combining the picture or luminance information, the color or chrominance information, and sound information together with appropriate display scan synchronizing signals to form an information signal which may be modulated upon a carrier for transmission. At the receiver, the opposite processes must take place in which the several components of the information signal are separated and appropriately processed. In most television broadcast formats such as the NTSC system used within the United States of America and the PAL system used in many European countries, the signal components corresponding to luminance, chrominance and sound are distinguished from each other and separated for individual processing largely on the basis of signal frequencies. For example, in the NTSC system, the available broadcast bandwidth is maintained at 6 megahertz. To conserve channel bandwidth and to transmit up to 4.1 megahertz of video signal, a vestigial sideband format in which the carrier is off center within the 6 megahertz channel bandwidth is used. The chrominance information is modulated upon a chrominance subcarrier separated from the picture carrier by approximately 3.58 megahertz. The sound information is separated from the picture carrier by 4.5 megahertz. To further conserve channel bandwidth, the luminance signal and chrominance signal share a part of the channel bandwidth.

Thus, a low cost receiver is able to select the chrominance, sound and luminance signal portions by using appropriate frequency response networks or filters and thereafter perform individual processing thereon. Unfortunately, the frequency selection process used in most television receivers results in the loss of substantial amounts of information or image content. Perhaps the most notable loss occurs in the video or luminance information which is severely bandwidth limited as a result of the separation of chrominance and sound information. While these losses have been recognized as less than desirable, the basic filtering processes used in most television receivers has made improvement difficult or impractical. The loss of higher frequency luminance information results directly in a reduction of the resolution in the displayed image. In seeking to maintain image resolution by preserving high frequency luminance information, practitioners have attempted to extract the luminance information which is found in the chrominance band. For example, practitioners have used analog glass delay line comb filters to separate luminance and chrominance information from the shared frequency spectrum while preserving high frequency luminance. It has been determined, however, that glass delay lines do not provide accurate delay and factory alignments are usually required to accurately separate luminance and chrominance signals.

Another approach contemplated by practitioners in the art seeking to improve the recovery of information at the receiver is found in the use of digital signal processing rather than the more pervasive presently used analog signal processing. Several advantages are provided by digital signal processing. For example, the separation of chrominance and luminance information in a digital environment may be carried forward using comb filters which use accurate delay and therefore accurately separate the luminance and the chrominance signals. Effective comb filters are more easily realized in the digital environment. In addition, a variety of information processing techniques which require memory for temporary storage of information are facilitated in a digital environment due to the ease with which memory may be achieved. Similarly, signal delays are relatively easy to perform in a digital signal environment. More generally, digital systems have evolved to a level of sophistication in which many digital systems have proven to be more economical to manufacture and have required fewer adjustments than their corresponding analog systems.

Despite the promise of advantages of the type set forth above to be realized by the application of digital electronic processing of television receiver signals, several problems and limitations have also arisen. For example, a fundamental bandwidth limitation is imposed upon digital processing circuits by the sample or clock rate which the system uses. Generally speaking, the sample or clock rate must be at least twice as large as the highest frequency signal component being processed. Unfortunately, increased sample or clock rates often results in dramatically increased system complexity which in turn increases costs. In addition, in broadcast formats such as the above-mentioned NTSC or PAL systems, the received information is analog information and thus the use of digital circuit processing thereon requires that the signals be converted from analog-to-digital signals. In most instances, the analog-to-digital conversion circuits used can only convert lower frequency components of the analog signal due to the practical limits of the sample rate. To convert higher frequency components of the analog signal requires more complex converters operated at high sample frequencies and more expensive delay elements because more samples have to be delayed. The results obtained in image resolution through maximizing the luminance information bandwidth generally fall short of the desired objective. Television images frequently lack a high resolution appearance despite improved luminance bandwidth.

Thus, even though practitioners in the art attempt to maximize the resolution of the displayed image, practitioners have for many years also employed an additional technique known as luminance or video peaking. Video peaking is the process of increasing the relative amplitude of luminance signal components having frequencies corresponding to the luminance transitions or image element "edges". It has been established by experience that luminance transitions which are rich in harmonics of approximately two and one half megahertz provide sharp images. Video peaking emphasizes these signal components and increases the "sharpness" or "crispness" of the displayed image.

In the typical peaking system presently used, the frequency response of the luminance signal amplifiers driving the display are increased or peaked at or near the frequencies of transition harmonics. Because the degree of video peaking desired varies among different viewers, a viewer accessible control is usually provided to accommodate viewer preferences.

Unfortunately, the effect realized by such video peaking systems is often erratic and extremely sensitive to broadcast signal variations and scene content changes. In addition, video peaking systems tend to be extremely interactive with the remainder of the luminance system often disturbing the luminance signal processing.

There remains, therefore, a need in the art for a video peaking system which may be independently controlled and which compensates for changes of broadcast signal conditions.

Accordingly, it is a general object of the present invention to provide an improved video processor. It is a more particular object of the present invention to provide an improved video processor which effectively peaks the luminance signal transition components within a composite video signal while providing independent control of video peaking and automatic compensation for signal variations.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 2A through 2F set forth frequency response curves of several portions of the present invention frequency multiplexed video processor;

FIGS. 5A through 5E set forth illustrative waveforms of the present invention automatic video peaking system.

DESCRIPTION OF THE PREFERRED EMBODIMENTS

Figure 1:
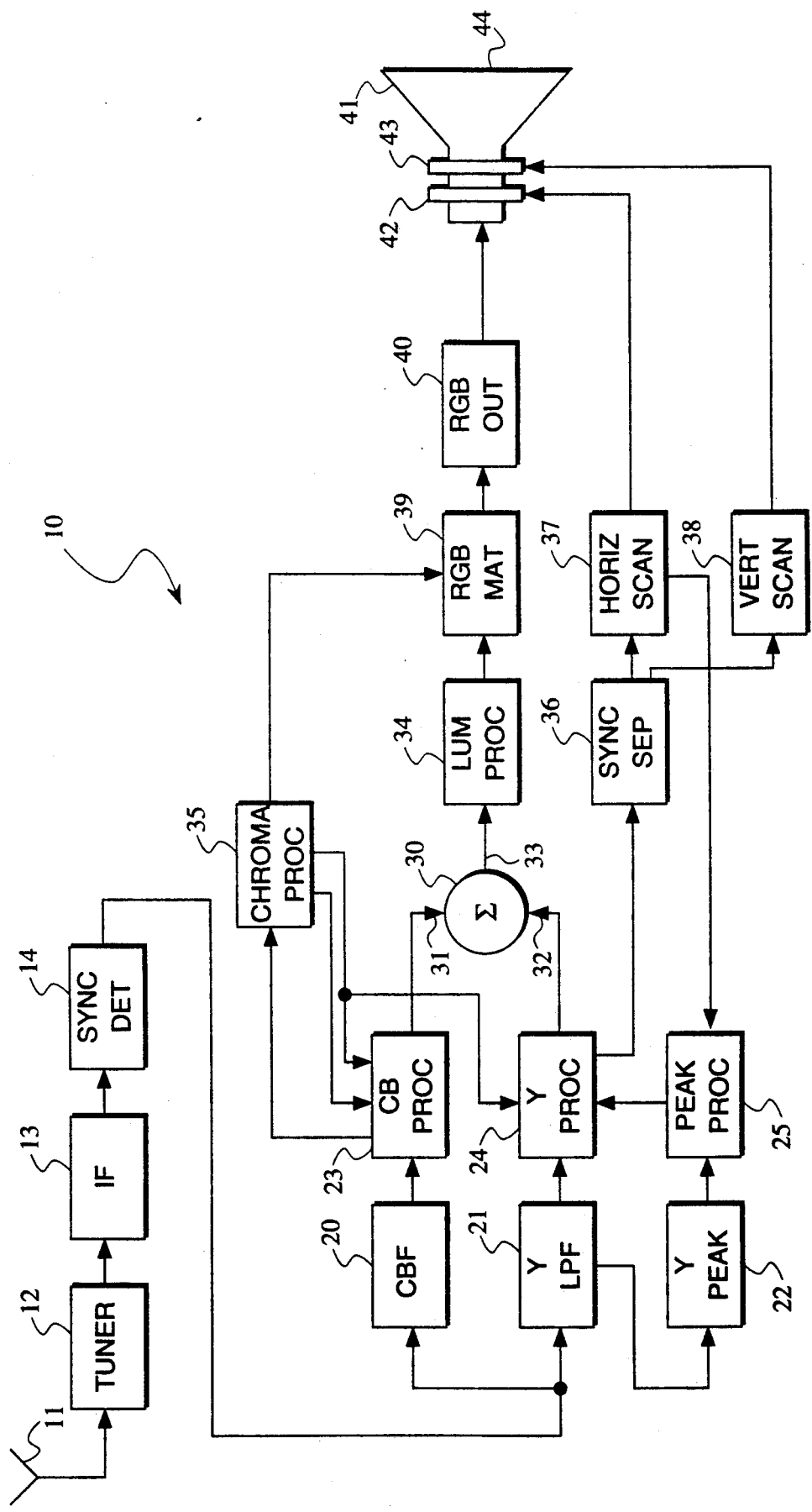
FIG. 1 sets forth a block diagram of a television receiver having an automatic video peaking system constructed in accordance with the present invention.

FIG. 1 sets forth a block diagram of a television receiver constructed in accordance with the present invention and generally referenced by numeral 10. Receiver 10 includes an antenna 11 coupled to a tuner 12. The output of tuner 12 is coupled to an intermediate frequency amplifier 13 which in turn is coupled to a synchronous detector 14. The output of synchronous detector 14 is coupled to frequency selective filters 20 and 21. Filter 21 is further coupled to a filter 22. The output of filter 20 is coupled to a signal processor 23 while the outputs of filters 2 and 22 are coupled to respective signal processors 24 and 25. The output of signal processor 25 is coupled to signal processor 24. Signal processor 23 is coupled to a chrominance processor 35. A summing network 30 includes a pair of inputs 31 and 32 coupled to the outputs of processors 23 and 24 respectively. Summing network 30 further includes an output 33 coupled to the input of a luminance signal processor 34. The latter is coupled to a RGB matrix 39. The output of chrominance processor 35 is also coupled to RGB matrix 39. The output of RGB matrix 39 is coupled to an RGB output circuit 40.

A cathode ray tube 41, constructed in accordance with conventional fabrication techniques, includes a display screen 44 and is coupled to RGB output circuit 40. Cathode ray tube 41 further includes a horizontal deflection yoke 42 and a vertical deflection yoke 43.

Signal processor 24 includes an output coupled to a sync separator 36 which in turn is coupled to a horizontal scan system 37 and a vertical scan system 38. Horizontal scan system 37 is coupled to signal processor 25 and horizontal yoke 42 while vertical scan system 38 is coupled to vertical deflection yoke 43.

In operation, antenna 11, tuner 12, intermediate frequency amplifier 13 and synchronous detector 14 function in accordance with conventional television system practice to receive a transmitted television signal which is selected by tuner 12 and amplified by intermediate frequency amplifier 13 to a level sufficient to facilitate the operation of synchronous detector 14. The latter performs a synchronous detection process in which the composite video signal which includes the luminance and chrominance as well as the horizontal and vertical synchronizing signals is recovered from the intermediate frequency carrier at the input to synchronous detector 14.

The composite video signal recovered by synchronous detector 14 is applied to filters 20 and 21 and from the latter to filter 22. The frequency responses of filters 20 through 22 are set forth in FIG. 2. With temporary reference to FIGS. 1 and 2 together, FIG. 2A sets forth the response of filter 20 which, in essence, comprises a chrominance signal bandpass filter for an NTSC receiver generally referenced by numeral 50. Thus, frequency response curve 50 defines a passband 51 which is generally centered at the chrominance subcarrier frequency of 3.58 megahertz and which is approximately 1 megahertz wide at the 6 db or "half points" 52 and 53. It will be apparent to those skilled in the art that filter 20 excludes all information within the composite video signal except for the portions thereof having frequencies within response curve 50. In a similar fashion, filter 21 defines a frequency response set forth in FIG. 2B and generally referenced by numeral 55. Response curve 55 defines extended regions 56 and 58 which are pass regions separated by a notch 57 therebetween. Notch 57 is generally coincident with the passband of curves 50 and 65. The 6 db or half points 60 and 61 generally coincide with 6 db points 68 and 53 of curves 67 and 50 in FIG. 2C and 2A respectively. The upper frequency region of response curve 55 defines a slope 59 having a 6 db point 62 at approximately 10 megahertz. Thus, the response curve of filter 21 shown in FIG. 2B essentially passes all frequency components of the composite video signal with the exception of the chrominance bandpass and luminance peaking components. It should also be noted that frequency response 55 of filter 21 is configured to accommodate both NTSC and the newly emerging high definition video signal sources. Accordingly, when used in an NTSC broadcast environment, it will be apparent that very little, if any, luminance information will be contained in the extended frequency portion 58 of curve 55 beyond notch 57.

FIG. 2C sets forth the frequency response of filter 22 generally referenced by numeral 65. As can be seen, response curve 65 shows that filter 22 excludes all frequencies with the exception of a relatively narrow passband 66. Passband 66 is centered at a center frequency 67 which, in the present application, is selected to be 2.5 megahertz. The bandwidth and center frequency of bandpass 66 is, to some extent, a matter of design choice and, as is described below in greater detail, is selected to embrace the portion of the luminance signal which benefits the most from luminance or video peaking processes. It has been found advantageous in the present system to utilize a bandwidth of approximately one-half megahertz for bandpass 66.

Returning to FIG. 1, the filtered output signals of filters 20, 21 and 22 are coupled to a corresponding trio of signal processors 23, 24 and 25 respectively. The operations of processors 23, 24 and 25 are set forth below in greater detail. However, suffice it to note here that processor 23 receives both chrominance and luminance signals within the 3 to 4 megahertz frequency bandwidth and as a result includes the color burst and chrominance signals together with 3 to 4 megahertz frequency luminance information. As is also set forth below in greater detail, processor 23 is operative upon the applied signal to perform a separation of the chrominance information from the luminance information and to perform the automatic chromacontrol, or ACC, function upon the chrominance signal components. The chrominance signal is applied to chrominance processor 35. Concurrently, the luminance signal components separated from the chrominance signal components are coupled to a summing network 30 at input 31. As will be also be described below in greater detail, the operation of processor 23 utilizes advantageous digital processing techniques such as digital comb filtering to efficiently recover the chrominance information without sacrificing the important high frequency luminance information in the 3 to 4 megahertz band which in many prior art television receivers is lost.

Processor 24 essentially processes all of the luminance information with the exception of signal components within the chrominance bandwidth processed by processor 23. Accordingly, processor 24 may be thought of as the primary or main luminance signal processor. As is described below in greater detail, processor 24 performs the important functions of providing a video clamping level and utilizes digital circuitry to provide a precise luminance delay network to match the time delay of the luminance signals from processor 23, prior to addition by summing network 30. The output of processor 24 which includes luminance information having frequencies from 0 to 3 megahertz and from 4 to 11 megahertz and which is free of any chrominance information is coupled to input 32 of summing network 30.

Processor 25 is configured to provide supplemental luminance signal processing and is intended to provide the desired luminance signal peaking. The operation of processor 25, therefore, is extremely important to the overall quality and appeal of the displayed image of receiver 10. As is known, the use of luminance signal peaking techniques in which the luminance signal components at significant transition points are emphasized enhances the displayed image. Essentially, the operations of peaking systems provide emphasized preshoot and overshoot components adjacent the luminance signal transitions to sharpen the displayed image and provide a "crisper" display. In accordance with an important aspect of the present invention, processor 25 performs this function by separately amplifying the luminance signal components used in luminance peaking at a gain level controlled in response to viewer preference and an automatic control system which derives a peaking control signal from the horizontal sync. This enhanced peaking signal is coupled to processor 24 and, in the manner set forth below in greater detail, is combined with the luminance signal processed thereby.

Summing network 30 combines the luminance information from processors 23 and 24 to provide a full spectrum luminance signal at output 33 which is applied to luminance processor 34. It should be noted that in accordance with an important aspect of the present invention described below in greater detail, the frequency multiplexing of the present invention system provides for complete recovery of the entire spectrum of luminance frequencies while nonetheless efficiently separating the chrominance signal. In addition, and in further accordance with the present invention, the separation and processing of the peaking frequency luminance signal components for supplemental amplification provides improved image enhancement due to higher quality luminance peaking. The luminance peaking prior to analog-to-digital converter 78 improves signal to noise ratio because the peaking frequency luminance components have optimum use of the dynamic range of the analog-to-digital converter. Luminance processor 34 provides further amplification and processing of the luminance signal for application to RGB matrix 39.

Similarly, chrominance processor 35 is operative in accordance with conventional receiver techniques to recover the color difference signals from the chrominance input from processor 23. The output color difference signals from processor 35 are also applied to RGB matrix 39. Matrix 39 is constructed in accordance with conventional fabrication techniques and, in essence, combines the color difference signals from chrominance processor 35 with the luminance signal from processor 34 to produce RGB color video signals which are amplified by output amplifier 40 and applied to cathode ray tube 41 in further accordance with conventional processing techniques.

Sync separator 36 receives a luminance signal output from processor 24 and separates the horizontal and vertical scan synchronizing signals therefrom which are used to synchronize the operations of horizontal and vertical scan systems 37 and 38 and provide energizing signals for horizontal and vertical yokes 42 and 43 respectively.

Figure 3A:
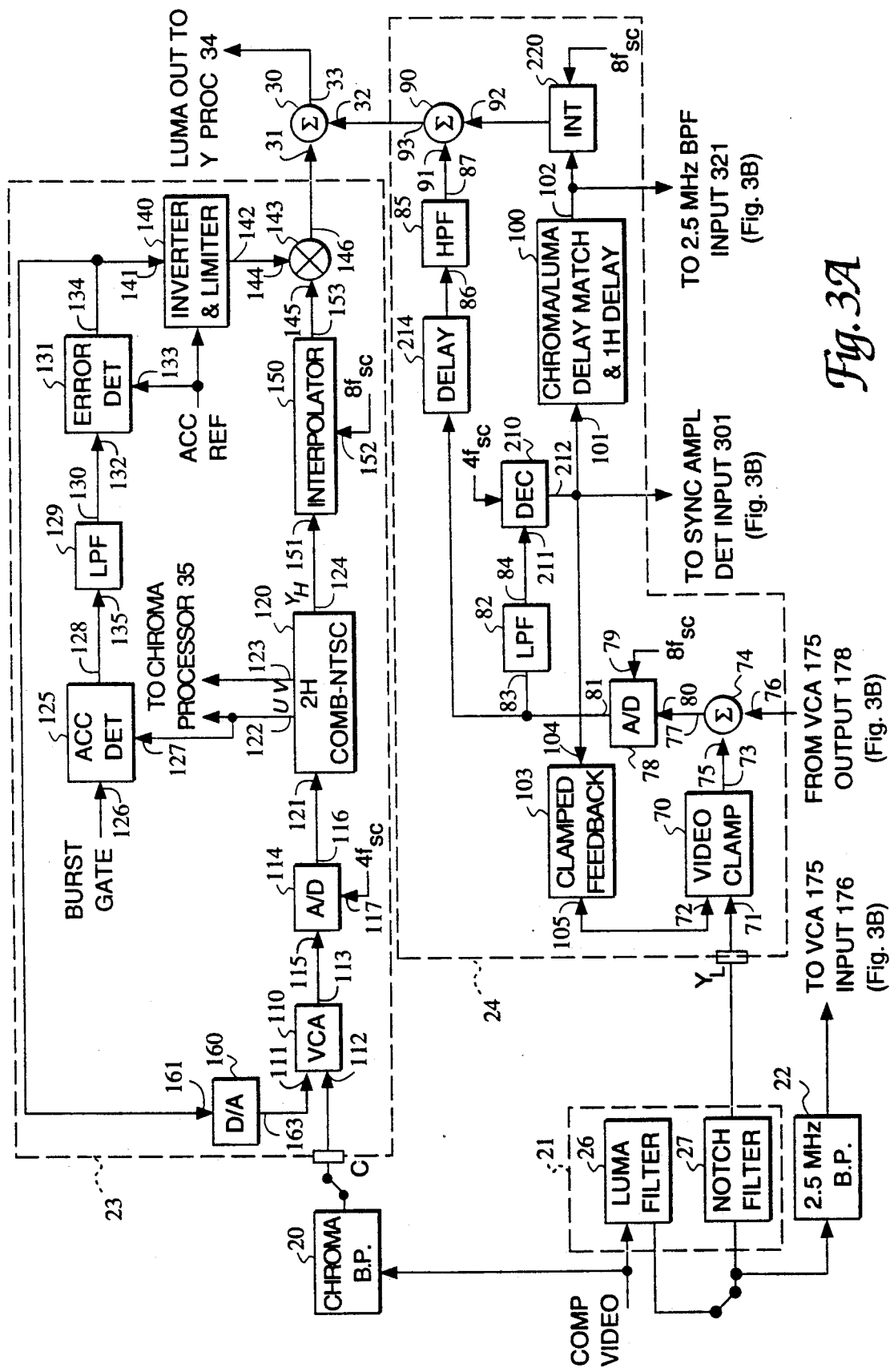
FIGS. 3A and 3B set forth a block diagram of a frequency multiplexed video processor and automatic video peaking system constructed in accordance with the present invention.
Figure 3B:
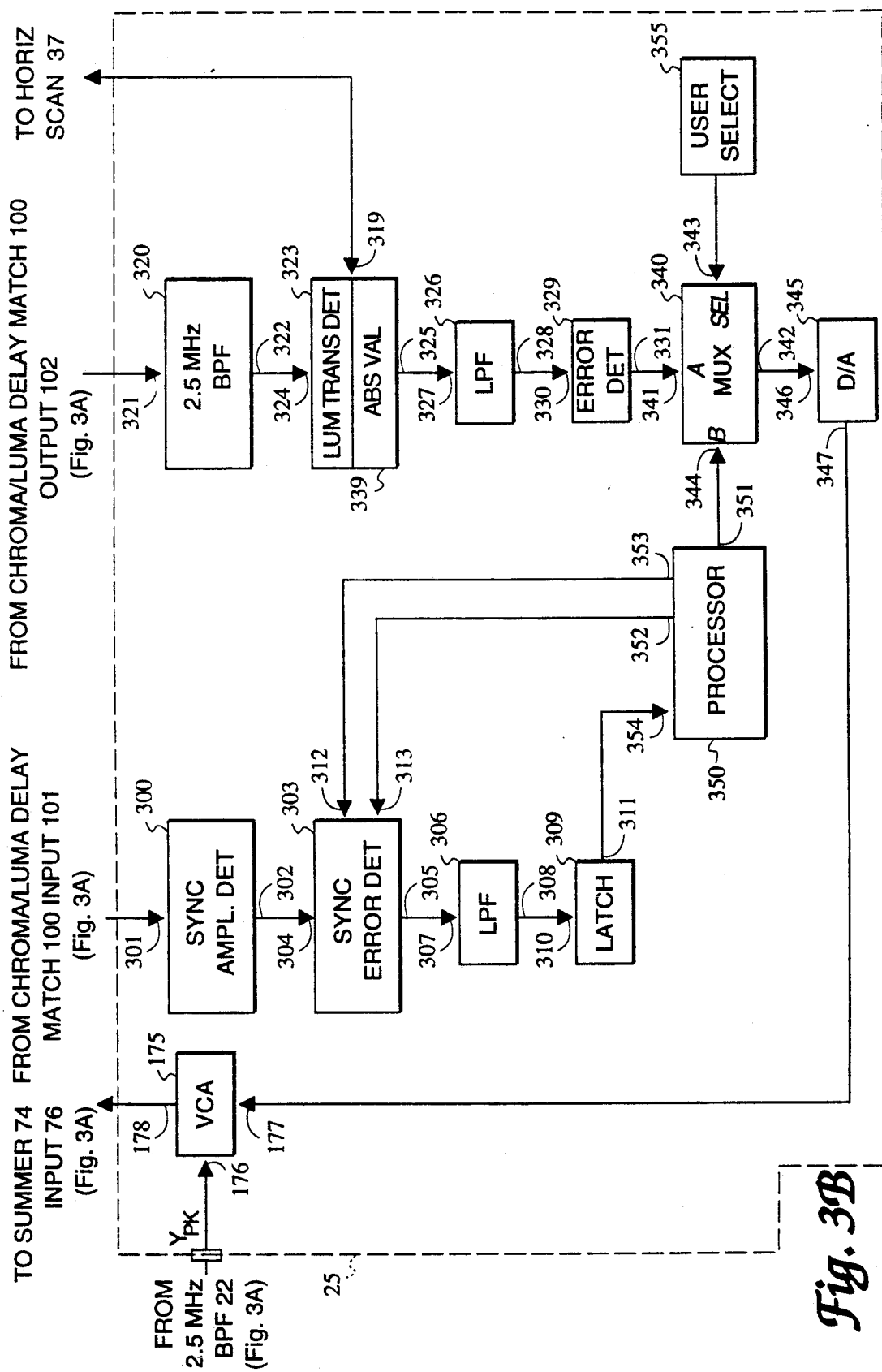

FIG. 3 sets forth a detailed block diagram of processors 23, 24 and 25 constructed in accordance with the present invention. Also shown in FIG. 3 are input filters 20, 21 and 22. As mentioned above in FIG. 1, the composite video output signal from synchronous detector 14 which includes luminance, chrominance and synchronizing information signals is applied commonly to filters 20 and 21. Filter 21 includes two filter stages 26 and 27 serially coupled between synchronous detector 14 (shown in FIG. 1) and processor 24 and defines the above-mentioned frequency response shown in FIG. 2B which generally excludes chrominance and luminance peaking information. The output of luminance filter 26 is substantially free of chrominance information and is coupled to a notch filter 27 and filter 22. Bandpass filter 22 is centered at approximately two and one half megahertz which corresponds to the desired video peaking frequency range. Thus, filter 22 couples the video peaking signal to amplifier 175 of processor 25. Notch filter 27 defines a complimentary response to bandpass filter 22 and functions to prevent the video peaking frequency signal components from bypassing amplifier 175.

Processor 24 includes a video clamp circuit 70 having an input 71 coupled to notch filter 27, an input 72, and an output 73. The latter is coupled to an input 75 of a summing network 74. An analog-to-digital converter 78 includes an 8fsc clock signal input 79, an input 80 coupled to output 77 of summer 74 and an output 81. A highpass filter 85, having a frequency response set forth in FIG. 2E, includes an input 86 coupled to output 81 of analog-to-digital converter 78 and an output 87 coupled to input 91 of a summing network 90. A low pass filter 82 having a frequency response corresponding to response curve 63 in FIG. 2D includes an input 83 coupled to output 81 of analog-to-digital converter 78 and an output 84. A clamp feedback circuit 103 includes an input 104 coupled to output 84 of low pass filter 82 and an output 105 coupled to input 72 of video clamp 70. A delay line network 100 includes an input 101 coupled to output 84 of low pass filter 82 and an output 102 coupled to input 92 of summing network 90. The summing network 90 includes an output 93 coupled to input 32 of summing network 30. Delay line 100 provides a delay equal to the required chrominance/luminance time difference plus a one horizontal line delay. The latter is needed to compensate for the one horizontal line delay introduced into the signals processed by the two horizontal line network of comb 120.

Processor 23 includes a gain controlled amplifier 110 having an input 112 coupled to filter 20, a control signal input 111, and an output 113. An analog-to-digital converter 114 includes an input 115 coupled to output 113 of amplifier 110, a clock signal input 117 coupled to a clock signal source having a frequency four times the chrominance subcarrier or "4fsc" (not shown) and an output 116. A two horizontal line NTSC comb filter 120 includes an input 121 coupled to output 116 of analog to digital converter 114, a pair of chrominance signal outputs 122 and 123, and a luminance signal output 124. A digital interpolator 150 includes an input 151 coupled to luminance output 124 of comb filter 120, a clock signal input 152 coupled to a clock signal source having a frequency eight times the chrominance subcarrier or "8fsc" (not shown), and an output 153. The latter is coupled to an input 145 of a multiplier network 143. Multiplier network 143 further includes an input 144 and an output 146 with the latter being coupled to input 31 of summing network 30. An automatic chrominance control detector 125 includes an input 126 coupled to a source of burst gating pulse (not shown), an input 127 coupled to output 122 of comb filter 120, and an output 128. A low pass filter 129 includes an input 135 coupled to output 128 of detector 125 and an output 130. An error detector 131 includes an input 132 coupled to output 130 of filter 129, a reference input 133 coupled to a source of ACC reference potential (not shown), and an output 134. An inverter and limiting circuit 140 includes an input 141 coupled to output 134 and an output 142 coupled to input 144 of summing network 143. A digital-to-analog converter 160 includes an input 161 coupled to output 134 of error detector 131 and an output 163 coupled to control input 111 of gain controlled amplifier 110.

Processor 25 is constructed in accordance with the present invention and includes a voltage controlled or variable gain amplifier 175 having a signal input 176 coupled to the output of bandpass filter 22, an output 178 coupled to input 76 of summing network 74 and a gain control input 177. A bandpass filter 320 having a center frequency of two and one half megahertz and a bandwidth corresponding generally to bandpass filter 22 includes an input 321 coupled to output 102 of delay network 100 and an output 322. A luminance transition detector 323 includes a signal input 324 coupled to output 322, a gating signal input 319 coupled to horizontal scan system 37 (seen in FIG. 1) and an output 325. An error detector 329 includes an input 330 coupled to output 325 by a low pass filter 326, a reference input 332 and an error signal output 331. A multiplexor 340 includes an input 41 coupled to output 331, an input 344, a selection input 343 coupled to a customer select switch 355, and an output 342. A digital-to-analog converter 345 couples output 342 of multiplexor 340 to gain control input 177 of amplifier 175. A processor circuit 350 which, in its preferred form, includes a conventional microprocessor and associated memory includes an output 351 coupled to inputs 344 and 332 of multiplexor 340 and error detector 329 respectively. Processor 350 further includes a pair of outputs 352 and 353 and a input 354.

A sync amplitude detector 300 includes an input 301 coupled to output 212 of decimator 211 and an output 302. A sync error detector 303 includes an input 304 coupled to output 302, an output 305 coupled to input 307 of a low pass filter 306, a reference input 312 coupled to output 353 of processor 350 and an enabling input 313 coupled to output 352 of processor 350. Low pass filter 306 couples the output of sync error detector 303 to an input 310 of a latch circuit 309. The output of latch circuit 309 is coupled to input 354 of processor 350.

In operation and by way of overview, the circuit of FIG. 3 provides frequency multiplexed luminance and chrominance processing in which processor 24 may be regarded as the primary luminance signal processor, processor 23 processes the chrominance band portion of luminance and chrominance information and processor 25 is dedicated to processing the luminance peaking information.

With respect to the operation of processor 24, it should be recalled that the composite video signal applied to filter 21 is subjected to the frequency response of filter 21 which includes filter sections 26 and 27. As a result, the signal applied to clamp circuit 70 has a frequency characteristic shown in FIG. 2B as curve 55 which may be generally characterized as the luminance signal frequencies above and below the chrominance bandpass frequency together with the scan synchronizing signals. Notch filter 27 provides attenuation of signal components at 2.5 megahertz. Since the signal at input 71 does not contain chroma signal, therefore, the burst signal is removed from the blanking pulse which permits video clamp 70 to operate in a more efficient manner in establishing the appropriate reference level for the luminance signal. The clamping level is established by a digitally encoded reference signal provided by clamped feedback circuit 103 and applied to input 72 of clamp 70. Thus, in response to the applied digitally encoded reference signal, the DC level of the blanking signal within the scan retrace interval is established within clamp 70. Concurrently, blanking pulse clamping establishes the appropriate DC component of the luminance signal.

Filter 22 couples the luminance peaking signal components from the output of filter 26 to gain controlled amplifier 175 where it is amplified in accordance with a gain control voltage signal at input 177. As is set forth below, the gain control signal at input 177 determines the degree of peaking in the luminance signal. The clamped luminance signal from clamp 70 is combined with the enhanced peaking signal from amplifier 175 by summing network 74 and converted from an analog signal to a digitally encoded signal by converter 78. To maintain the maximum amount of the all-important high frequency luminance signal components within the converted signal, analog-to-digital converter 78 is operated in response to a clock signal input having a relatively high frequency. While the frequency of clock signal used is, to some extent, a matter of design choice, it has been found convenient in the present system to utilize a clock signal having a frequency eight times that of the chrominance subcarrier. The digital signal produced by converter 78 is filtered by a digital low pass filter 82 having a frequency response corresponding generally to response curve 63 in FIG. 2D. The low frequency signal components passed by filter 82 are applied to a decimator in which the digital signal data rate is down converted from 8fsc to 4fsc afterwhich it is coupled to clamp feedback circuit 103 which processes the digitally encoded low frequency luminance signals to provide a DC feedback input for clamp 70. Because of the conversion to a digitally encoded signal provided by converter 78, delay matching network 100 may be correspondingly constructed using digital circuit techniques. The data rate reduction of the digital luminance signal produced by decimator 210 facilitates a considerable reduction in this size of delay matching network 100. As mentioned above and in accordance with an important aspect of the present invention, the provision of precise delay of the luminance signal within processor 24 is greatly facilitated in the digital signal environment. The delay of the wider bandwidth luminance signal is required in receivers such as receiver 10 to compensate for the delays associated with the narrow band processing of the chrominance signal and the luminance signal (3 to 4 megahertz), and for the delays in the comb filter and the interpolator. As mentioned above, comb filter 120 is in its preferred form, a two horizontal line comb. While this improves its performance, the two line structure introduces a horizontal line delay which must be compensated within the remainder of the luminance processor. Accordingly, the delay provided by delay network 100 includes this additional horizontal line delay. The digital processing within delay network 100 facilitates the provision of such delays and ensures precise coincidence of the luminance and chrominance signals in the displayed image and enhances overall image quality.

The delayed luminance signal is combined with the remainder of the luminance signal filtered by highpass filter 85, and delayed by delay match 214, within summing network 90. Highpass filter 85 defines a frequency characteristic corresponding to response curve 69 in FIG. 2E and is operative to exclude the low frequency video components selected by low pass filter 82. This exclusion of lower frequency luminance components is necessary to ensure that all low frequency luminance signal components are subjected to the delay within delay network 100. The separation of low frequency and high frequency signal paths facilitates the use of a considerably reduced size delay network because the lower frequency luminance signal can be down converted to a slower data rate of 4fsc by decimator 210 before processing by delay 100 and thereafter up converted by interpolator 220 back to an 8fsc data rate prior to application to summing network 90. In addition, it should be noted that the input signals to summing network 90 are digitally encoded signals. Thus, summing network 90 should be understood to include a conventional digital signal adder. The digitally encoded combined signal at the output of summing network 90 is applied to summing network 30 which also comprises a digital signal adder. Thus, processor 24 provides the all important luminance processing operations of proper video clamping together with the imposition of a precise luminance signal delay while maintaining the frequency response shown in FIG. 2B. As a result, the output signal of processor 24 maintains all of the luminance signal components of the input signal within the response shown in FIG. 2B and further includes the enhanced or emphasized luminance peaking signals provided by processor 25. In essence, then, the output signal of processor 24 includes all luminance signals but for those falling within the chrominance signal bandwidth. One important function of processor 23 is to provide the remaining luminance components to complete the luminance signal and provide a full spectrum response.

Turning now to the operation of processor 23, it should be recalled that the input signal to processor 23 comprises the composite video signal from synchronous detector 14 filtered by bandpass filter 20 in accordance with the frequency response shown in FIG. 2A. Thus, the input signal to gain controlled amplifier 110 includes the chrominance and luminance signal information falling within the bandpass shown in FIG. 2A. As is described below in greater detail, gain controlled amplifier 110 has a variable signal gain which, in essence, operates to maintain a constant signal output level for processor 23. Thus, gain controlled amplifier 110 amplifies the applied luminance and chrominance signals and couples them to analog-to-digital converter 114. The signal applied to converter 114 does not include the higher frequency signal components which are applied to converter 78 within processor 24. As a result, a lower frequency clock signal may be utilized which permits the use of a considerably smaller two horizontal line network for comb filter 120. Accordingly, it has been found convenient to utilize a clock signal input to converter 114 having a frequency four times the chrominance subcarrier frequency. Converter 114 operates in accordance with conventional processes to convert the applied analog signal to a corresponding digitally encoded signal which is applied to comb filter 120. It should be recalled that the digitally encoded signal at the output of converter 114 includes both chrominance and luminance signals within the bandpass response of filter 20. Comb filter 120 comprises a digital comb filter which is extremely efficient at separating the luminance and chrominance information from the applied input without sacrificing the important luminance components. As a result, substantial advantage in the efficiency and effectiveness of the present invention system is achieved by the use of digitally encoded signal processing within processor 23. The separated chrominance signal components are coupled to chrominance processor 35 as described above.

It should be noted that while considerable reduction of complexity and economy is realized due to the use of a slower sampling rate in analog-to-digital converter 114 which in turn facilitates the use of a smaller two horizontal line comb network. However, because the resulting luminance signal at output 124 of comb filter 120 is a digitally encoded signal having a lower clock rate than that used in processor 24, the combination of the lower clock rate luminance signal output of comb filter 120 with the higher clock rate luminance signal provided by processor 24, requires the use of interpolator 150 interposed between the luminance signal output of comb filter 120 and summing network 30. Thus, interpolator 150 is operative in response to the same clock signal input utilized by analog-to-digital converter 78 within processor 24. Interpolator 150 functions in accordance with conventional fabrication techniques to convert the slower clock signal output of comb filter 120 to the higher clock signal rate or data rate of the applied clock signal at input 152 thereof. The use of lower frequency converter 114 and interpolator 150 achieves an overall economic advantage in that the two horizontal line memory comb filter 120 will require half as much memory than if the clock rate was twice as fast, because with faster sample rate, the number of video samples in the horizontal line will be higher.

The chrominance output signal of comb filter 120 is further processed by a conventional automatic chrominance control, or ACC, loop formed by ACC detector 125, low pass filter 129 and error detector 131. In accordance with conventional processing techniques, the burst gate pulse applied to detector 125 permits the separation of the reference chrominance signal burst from the remainder of the signal which is then amplitude detected by detector 125 and averaged by low pass filter 129 and compared to a predetermined reference number by detector 131. The output of detector 131 is an amplitude correction signal which is fed back to voltage controlled amplifier 110 through a digital-to-analog converter 160. The use of digital-to-analog converter 160 is required because voltage controlled amplifier 110 is an analog device which responds to an input analog control signal. The resulting operation of the control loop thus formed maintains a substantially constant chrominance signal output level for use by chrominance processor 35.

As a consequence of the operation of the automatic chrominance control or ACC loop within processor 23, a correspondingly constant amplitude is maintained for the luminance signal components which are concurrently amplified by gain controlled amplifier 110. It has been found desirable not to increase the amplitude of the luminance components of the video information in the range of three to four megahertz. Therefore, any increase of these luminance components due to automatic chrominance control action in response to chrominance reference burst decreases is compensated for by the action of multiplier 143. This compensation is accomplished by inverting the chrominance correction signal and applying it to multiplier 143 at input 144. The luminance signal at the output of multiplier 143 is reduced by this inverted correction signal which compensates for the increase caused by the automatic chrominance control amplifier (VCA 110). As a result, luminance signals within the three to four megahertz range are processed using the full dynamic range of analog-to-digital converter 114 while remaining unaffected by the action of the automatic chrominance control system.

The negative going chrominance control signal is limited by inverter and limiter 140. As a result, gain reductions implemented by VCA 110 within the automatic chrominance control system which cause reductions of the luminance signal are not compensated for by multiplier 143 since such reductions are not visibly degrading to the displayed luminance signal. The luminance signal output from multiplier 143 is applied to summing network 30. Summing network 30 is also a digital adder combining the luminance signal outputs of processors 23 and 24 to provide a full spectrum luminance signal output which is coupled to luminance processor 34 (seen in FIG. 1).

Processor 25 is believed best understood if an initial overview of its operation is undertaken. Accordingly, the combination of bandpass filter 320, luminance transition detector 323, low pass filter 326, error detector 329 and multiplexor 340 cooperate to produce a digital signal indicative of the amplitude of luminance transition signal components which occur at the signal transitions of the horizontal sync pulse. This digital number is converted by digital-to-analog converter 345 to produce an analog control signal which adjusts the gain of gain controlled amplifier 175. Concurrently, the combination of sync amplitude detector 300, sync error detector 303 and low pass filter 306 cooperate to provide a compensating error signal which is applied to processor 350 to adjust the operating point of the video peaking system in response to changes of horizontal sync pulse amplitude. Thus, the video peaking system of processor 25 is not "fooled" by sync amplitude changes in using the horizontal sync transition components to establish an automatic peaking level.

More specifically, the output signal of delay network 100 is coupled to the input of bandpass filter 320. This input signal is set forth in FIG. 5A which is intended to represent a typical composite video signal from which the chrominance information has been removed. It should be recalled from the above discussions that filter 26 provides this elimination of chrominance information. The composite video waveform of FIG. 5A generally referenced by numeral 333 defines a pair of successive horizontal blanking pulses 334 and 336 separated by a luminance signal 338. Blanking pulses 334 and 336 further include horizontal synchronizing pulses 335 and 337 respectively. Filter 320 passes only those luminance signal components from composite video waveform 333 which correspond to the desired video peaking frequencies. This frequency selected signal is coupled to luminance transition detector 323. As mentioned above and in accordance with an important aspect of the present invention, the automatic peaking system within processor 25 utilizes the luminance transition components associated with the horizontal sync pulses to provide a reliable basis for deriving an error voltage which may be used to control the gain of the video peaking system. Accordingly, luminance transition detector 323 is periodically enabled by a horizontal rate signal produced by horizontal scan system 37 and applied to enabling input 319. To properly recover the luminance transition components associated with the horizontal synchronizing pulses, it is important that the horizontal rate pulse applied to enable luminance detector 323 be slightly wider than the horizontal synchronizing pulses themselves. Luminance detector 323 includes a luminance transition detecting circuit which, when properly enabled during each horizontal synchronizing pulse, produces an output signal shown in FIG. 5C. Examination of FIG. 5C together with FIG. 5A shows that leading edge 356 of sync pulse 335 produces a transition response 360 within luminance detector 323. Correspondingly, trailing edge 357 of synchronizing pulse 335 produces an opposite phase luminance transition 361. Similarly, leading edge 358 and trailing edge 359 of sync pulse 337 produce corresponding oppositely phased transition signals 362 and 363 within luminance transition detector 323. Luminance transition detector 323 further includes an absolute value circuit 339 which converts the transition waveform shown in FIG. 5C to the single polarity waveform shown in FIG. 5D. Comparisons of FIGS. 5C and 5D shows that transition component 360 has been converted to a pair of positive going signals 364 and 365 while transition signal component 361 has been converted to positive going signal components 366 and 367. Similarly, transition components 362 and 363 have been converted to positive going components 368 through 371 respectively. This conversion for absolute value processing of the transition components within absolute value circuit luminance transition detector 323 is undertaken to permit the use of low pass filter 326 in averaging the transition signal components to produce an error voltage such as that shown in FIG. 5E. Low pass filter 326 averages the transition signal components of the sync signal and does not respond to the transitions occurring between blanking pulses in luminance signal 338. Therefore, the output of the low pass filter is a DC value representing the peak amplitude of the sync transition signal.

In any event, the output of low pass filter 326 corresponding to FIG. 5E forms an error signal corresponding to the degree of luminance peaking signals present within processor 24. Microprocessor 350 includes a conventional input circuit (not shown) which enables the user to establish a desired video peaking level which corresponds to the user's preference as to video peaking in the displayed image. In accordance with an important aspect of the present invention, processor 350 couples this preference signal to reference input 332 of error detector 329. Error detector 329 includes a conventional comparator which compares the error signal at input 330 to the reference signal at input 332 and produces an output signal indicative of the difference therebetween which is coupled by multiplexor 340 to digital-to-analog converter 345. Converter 345 converts the applied digital signal to a corresponding analog control voltage which, when applied to control input 177 of voltage controlled amplifier 175, provides a corresponding adjustment of video peaking gain which operates to conform the degree of video peaking within the present invention system to that selected by the user.

The control system thus described for processor 25 responds to the amplitude of transition component signals produced by the horizontal sync pulses to maintain the desired video peaking. However, it has been found that the amplitude of the horizontal synchronizing pulses within the composite video signal is subject to substantial variation caused by broadcast signal inconsistencies, nonstandard video signals such as are typically produced by computers and computer games, as well as nonlinearities within the receiver processing systems. As a result, it has been found desirable in optimizing the performance and consistency of the present invention automatic video peaking system to provide compensation for amplitude variations of horizontal sync. Accordingly, the composite video signal at output 212 of decimator 210 is coupled to sync amplitude detector 300. Sync amplitude detector 300 separates the horizontal synchronizing pulses from the remainder of the composite video signal to produce the sync pulse wave form shown in FIG. 5B. It should be noted that, despite the possibility of substantial variation of the horizontal sync pulse amplitude between various video sources, a standard for correct sync pulse amplitude does exist and is well known. Accordingly, processor 350 includes a stored reference sync amplitude signal which corresponds in its preferred form to this standard. This reference sync signal is applied to input 312 of error detector 303. Detector 303 compares the amplitude of sync pulse from amplitude detector 300 to the standard sync pulse signal and produces an output error voltage indicative of the difference therebetween. This error voltage is averaged by low pass filter 306 and stored within latch 309 to provide a compensating signal which is used by processor 350 to adjust the reference voltage applied to input 332 of error detector 329. As a result, the reference point of error detector 329 is shifted in a compensating manner to adjust the video peaking of the present invention system in response to sync amplitude deviations from standard horizontal sync. Without this important aspect of the present invention system, the video peaking observed by the user would be subject to undesired changes due to signal variations or the use of signal sources having different sync pulse amplitudes.

Because the operation of processor 25 is dependent upon the proper timing of luminance transition detector 323 and sync amplitude detector 300 with respect to the horizontal sync pulse signals, the reliability of the system requires that the horizontal scan system be properly synchronized. Accordingly, processor 350 produces an enabling signal at input 313 of sync error detector 303 which suspends operation of detector 303 in the event horizontal synchronization is not present. The interruption of the operation of detector 303 causes the output of error detector 323 to generally conform to the user selected peaking signal at input 332.

In addition, processor 25 provides a user select 355 which controls multiplexor 340 and which permits the user to override the operation of the automatic video peaking system by switching multiplexor 340 from input 341 to input 344. It should be recalled that the signal applied to input 344 corresponds to the above-described user preference input. As a result, once the user has actuated user select 355 to switch multiplexor 340, the gain of voltage controlled amplifier 175 is established at the user preference level and the automatic system is completely aborted.

It will be apparent to those skilled in the art that the present invention system shown in FIG. 3 provides substantial advantages over the prior art systems. The use of frequency multiplexing between processors 23, 24 and 25 permits individual attention to each component of the luminance and chrominance signal frequency spectra and minimizes the loss of information within the system. The use of digital signal processing within the present invention system achieves substantial economy of operation as well as improved performance. In particular, the independent processing of luminance peaking components by processor 25 permits precise control of luminance peaking without interference or interaction of peaking signals with the remainder of the luminance signal processing. The automatic video peaking of processor 25 provides a substantially constant video peaking action corresponding to a user preference level. The system adjusts to variations of sync amplitude to maintain a reliable peaking level response.

Figure 4:
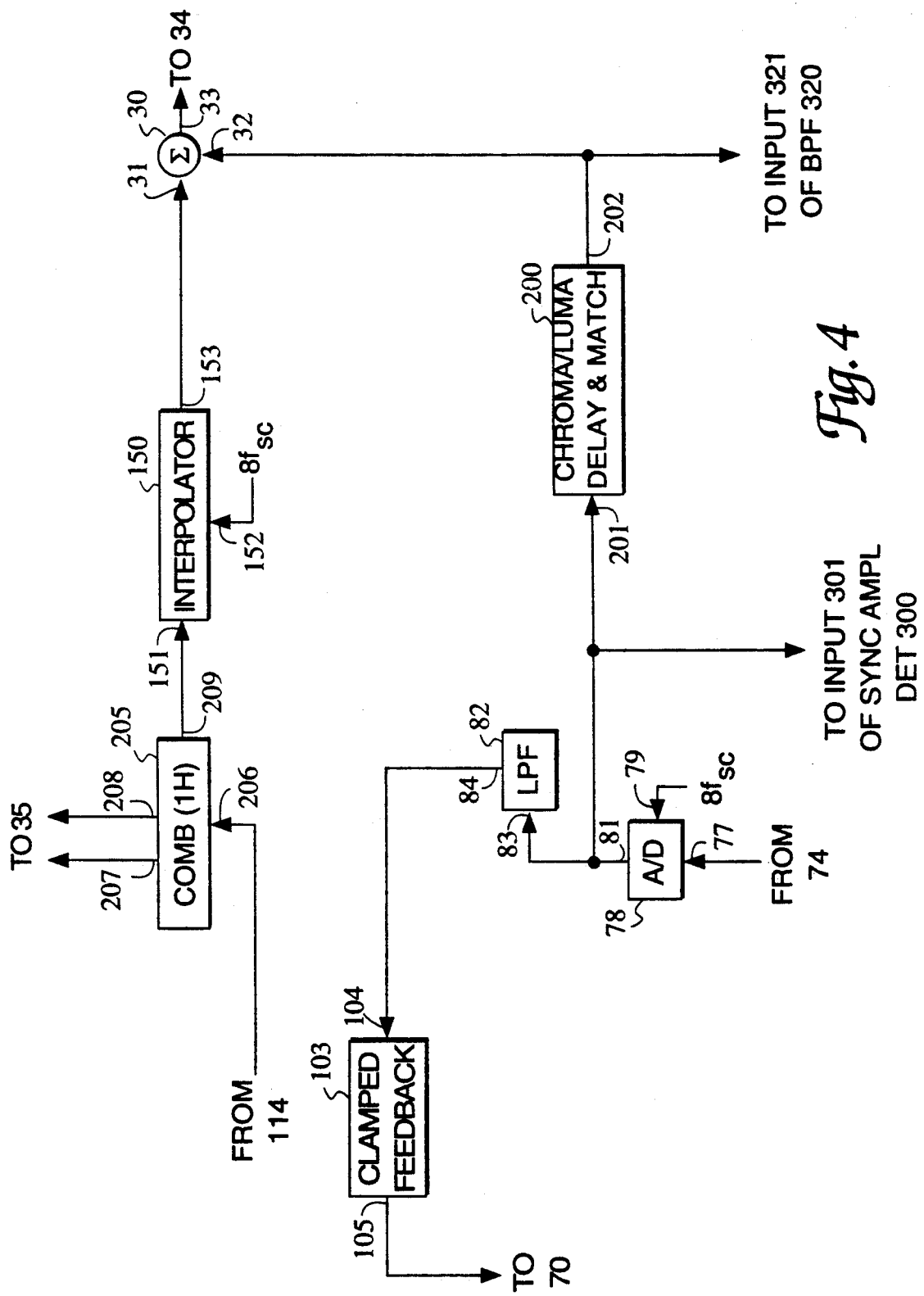
FIG. 4 sets forth a block diagram of an alternate embodiment of the frequency multiplexed video processor of FIG. 3.

FIG. 4 sets forth an alternate embodiment of the present invention which is generally the same as the embodiment shown in FIG. 3 with the exception of the use of a smaller comb filter 205 in place of comb filter 120 in the embodiment of FIG. 3. In addition, the embodiment shown in FIG. 4 utilizes a correspondingly smaller delay network 200 in place of delay network 10 and eliminates highpass filter 85 and summing network 90. The remainder of the embodiment shown in FIG. 4 is identical to the embodiment shown in FIG. 3.

Specifically, analog-to-digital converter 78 includes an input 77 coupled to summing network 74, a clock input 79 and an output 81. Low pass filter 82 includes an input 83 coupled to converter 78 and an output 84 coupled to input 104 of clamp feedback circuit 103. The output of converter 78 is further coupled to an input 201 of a delay network 200 and to input 301 of sync amplitude detector 300 (seen in FIG. 3). Delay network 200 includes an output 202 coupled directly to input 32 of summing network 30 and to input 321 of bandpass filter 320 (seen in FIG. 3). A one horizontal line comb filter 205 includes an input 206 coupled to analog-to-digital converter 114 (seen in FIG. 3). Comb filter 205 further includes chrominance outputs 207 and 208 coupled to chrominance processor 35 (seen in FIG. 1) and a luminance output 209 coupled to input 151 of interpolator 150. The output of interpolator 150 is coupled to input 31 of summing network 30 in the same manner as set forth in FIG. 3. In further accordance with the embodiment of FIG. 3, the output of summing network 30 is coupled to luminance processor 34 (shown in FIG. 1).

The embodiment of FIG. 4 is configured to facilitate the use of a smaller comb filter 205 having a size corresponding to one horizontal line of information. Accordingly, the one horizontal line structure of comb filter 205 does not introduce the additional horizontal line delay experienced by the two horizontal line comb structure of comb 120 used in the embodiment of FIG. 3. Accordingly, delay network 200 is not required to provide a compensating horizontal line delay and thus comprises a substantially smaller delay network having sufficient delay to provide the required chrominance/luminance time delay. As a result, the luminance output signal from converter 78 need not be separately filtered in the manner provided by filters 82 and 85 in the embodiment of FIG. 3 but may instead be applied directly to input 201 of delay network 200. With the elimination of separate processing through filters 82 and 85 in the manner shown in the embodiment in FIG. 3, the embodiment of FIG. 4 no longer requires summing network 90 and thus the output of delay network 200 may be applied directly to summing network 30. Low pass filter 82 is maintained in the feedback path from converter 78 to clamped feedback network 103 to maintain the desired frequency response of the video clamping network. This embodiment also does not require decimator 210 and interpolator 220 shown in FIG. 3.

Thus, it will be apparent from the examination of FIG. 4 that substantial economy has been obtained in comparison to the embodiment of FIG. 3 by the use of a smaller comb filter, a smaller delay network and the elimination of highpass filter 85, decimator 210, interpolator 220 and summing network 90. Despite the reduced cost of the embodiment shown in FIG. 4 with respect to the embodiment of FIG. 3, however, many of the performance advantages of the present invention system are retained including the frequency multiplexing which provides the individual processing of the luminance signal within the chrominance band, the luminance peaking frequencies, and the extended luminance frequencies processed by processor 24. Thus, the embodiment of FIG. 4, in essence, practices the present invention in a lower cost manner.

What has been shown is an automatic video peaking system within a cost effective, efficient and high performance digital video processor for use in a television receiver, computer monitor or other similar processing system. The system utilizes a combination of frequency multiplexing together with independent control of the video peaking components within the processed signal to optimize and maintain the preferred video peaking action.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in an image display system responsive to a composite video signal having a periodic scan synchronizing signal and a luminance signal each defining amplitude transitions, automatic video peaking means comprising:
   means for receiving said composite video signal;
   means for detecting said amplitude transitions of said periodic scan synchronizing signal;
   means for deriving a peaking gain control signal related to the magnitude of said amplitude transitions of said periodic scan synchronizing signal;
   means for selecting a portion of said luminance signal within a predetermined frequency range for use as a video peaking signal;
   means for amplifying said video peaking signal at a gain responsive to said peaking gain control signal to form an amplified peaking signal; and
   means for combining said amplified peaking signal with said luminance signal to alter said amplitude transitions of said luminance signal.

2. Video peaking means as set forth in claim 1 wherein said means for deriving includes:
   means for establishing a peaking reference signal related to a predetermined scan synchronizing signal amplitude transition reference;
   means for comparing said peaking gain control signal to said peaking reference signal to produce a peaking error signal related to the difference therebetween; and
   means for adjusting said gain of said means for to reduce said peaking error signal.

3. Video peaking means as set forth in claim 2 wherein said means for selecting includes means for filtering said luminance signal having a first bandpass filter.

4. Video processing means as set forth in claim 3 wherein said means for deriving includes:
   means for filtering said composite video signal having a second bandpass filter defining a bandwidth generally corresponding to said predetermined frequency range to provide filtered amplitude transition signal components for said luminance and scan synchronizing signals;

means for separating said filtered amplitude transition signal components of said scan synchronizing signal;

means for developing the absolute value of said filtered amplitude transition signal components of said scan synchronizing signal; and means for averaging said absolute value over a period substantially greater than that of said scan synchronizing signal.

5. Video peaking means as set forth in claim 4 further including:

means for providing a user adjustable preference signal corresponding to a user determined alteration of said luminance signal amplitude transitions; and means for selectively switching said video peaking signal gain of said means for amplifying between said peaking gain control signal and said preference signal.

6. Video peaking means as set forth in claim 1 further including:

means for establishing a reference scan synchronizing signal amplitude;

means for detecting the amplitude of said scan synchronizing signal;

means for comparing said detected scan synchronizing signal amplitude to said reference scan synchronizing signal amplitude; and means for changing said peaking gain control signal in response to said means for comparing.

7. For use in an image display system responsive to a composite video signal having a periodic scan synchronizing signal and a luminance signal each defining amplitude transitions, an automatic video peaking method comprising the steps of:

receiving said composite video signal;

detecting said amplitude transitions of said periodic scan synchronizing signal;

deriving a peaking gain control signal related to the magnitude of said amplitude transitions of said periodic scan synchronizing signal;

selecting a portion of said luminance signal within a predetermined frequency range for use as a video peaking signal;

amplifying said video peaking signal at a gain responsive to said peaking gain control signal to form an amplified peaking signal; and combining said amplified peaking signal with said luminance signal to alter said amplitude transitions of said luminance signal.

8. A video peaking method as set forth in claim 7 wherein said deriving step includes the steps of:

establishing a peaking reference signal related to a predetermined scan synchronizing signal amplitude transition reference;

comparing said peaking gain control signal to said peaking reference signal to produce a peaking error signal related to the difference therebetween; and adjusting said gain in said amplifying step to reduce said peaking error signal.

9. A video peaking method as set forth in claim 8 wherein said selecting step includes the step of filtering said luminance signal through a bandpass filter.

10. A video processing method as set forth in claim 9 wherein said deriving step includes the steps of:

filtering said composite video signal through a bandpass filter having a bandwidth generally corresponding to said predetermined frequency range to provide filtered amplitude transition signal components for said luminance and scan synchronizing signals;

separating said filtered amplitude transition signal components of said scan synchronizing signal;

developing the absolute value of said filtered amplitude transition signal components of said scan synchronizing signal; and averaging said absolute value over a period substantially greater than that of said scan synchronizing signal.

11. A video peaking method as set forth in claim 10 further including the step of:

providing a user adjustable preference signal corresponding to a user determined alteration of said luminance signal amplitude transitions; and selectively switching said video peaking signal gain in said amplifying step between said peaking gain control signal and said user adjustable preference signal.

12. A video peaking method as set forth in claim 7 further including the steps of:

establishing a reference scan synchronizing signal amplitude;

detecting the amplitude of said scan synchronizing signal;

comparing said detected scan synchronizing signal amplitude to said reference scan synchronizing signal amplitude; and changing said peaking gain control signal in response to said comparing step.

13. Video peaking means for use in a television receiver responsive to a television composite video signal, said video peaking means comprising:

means for detecting the amplitude of horizontal sync signal transitions within said composite video signal; and means for altering the gain of said video peaking means a predetermined frequency range portion of the luminance signal within said television composite video signal in response to the amplitude of horizontal sync signal transitions.

14. Video peaking means as set forth in claim 13 further including:

means for producing a compensation signal related to the detected amplitude of horizontal sync signal transitions; and means for further changing said gain of said video peaking means in response to said compensation signal.

* * * * *